United States Patent [19]

Lindgren

[11] 4,171,055

[45] Oct. 16, 1979

[54] FILM CASSETTE OPENER

[76] Inventor: Bertil Lindgren, Storgatan 37 E, 152 00 Strängnäs, Sweden

[21] Appl. No.: 836,210

[22] Filed: Sep. 23, 1977

[30] Foreign Application Priority Data

Oct. 5, 1976 [SE] Sweden ................................ 7611004

[51] Int. Cl.[2] ........................ B65G 65/04; B65D 49/12

[52] U.S. Cl. ........................................ 414/412; 29/427

[58] Field of Search .................. 225/93, 103; 214/304, 214/305, 310; 29/427, 806, 234

[56] References Cited

U.S. PATENT DOCUMENTS

| | | | |
|---|---|---|---|
| 1,352,378 | 9/1920 | Postma | 214/305 |
| 3,487,965 | 1/1970 | Gale | 214/305 |
| 3,494,519 | 2/1970 | Koehler | 225/93 |
| 3,827,588 | 8/1974 | Gnage et al. | 214/305 |

*Primary Examiner*—Lawrence J. Oresky

*Attorney, Agent, or Firm*—Silverman, Cass & Singer, Ltd.

[57] ABSTRACT

A film cassette opener in which a film take-up spool in the cassette is forced in its axial direction out of the cassette. The opener has two jaws clasping the sides of the cassette and an ejection bar reciprocally movable in an axial direction with respect to the cassette. One end of the bar thrusts against the film take-up spool to cause one end cover of the cassette to be thrust away forcing the take-up spool with film out of the cassette.

7 Claims, 6 Drawing Figures

FILM CASSETTE OPENER

This invention relates to a film cassette opener for opening cylindric film cassettes with a film rolled up therein.

Heretofore such film cassettes were opened manually with some difficulty. It is, therefore, the object of the invention to facilitate the opening of the cassette by means of a mechanically operated opener.

For this purpose, a film cassette opener according to the invention comprises a pair of mutually displaceable jaws with contact surfaces, which preferably are provided with saw teeth or jags to reliably retain a film cassette, which is positioned between the jaws and holds a film rolled up on a spool, and an axially reciprocatory ejector bar, which by a mechanic drive means is axially movable relative to the retained film cassette and arranged with one end to thrust against the spool with film, so that the spool first presses off the outer end wall cover of the film cassette and thereafter together with the film is pressed out of the film cassette.

The invention is illustrated by some embodiments shown by way of example in the accompanying drawings.

Figure 1:
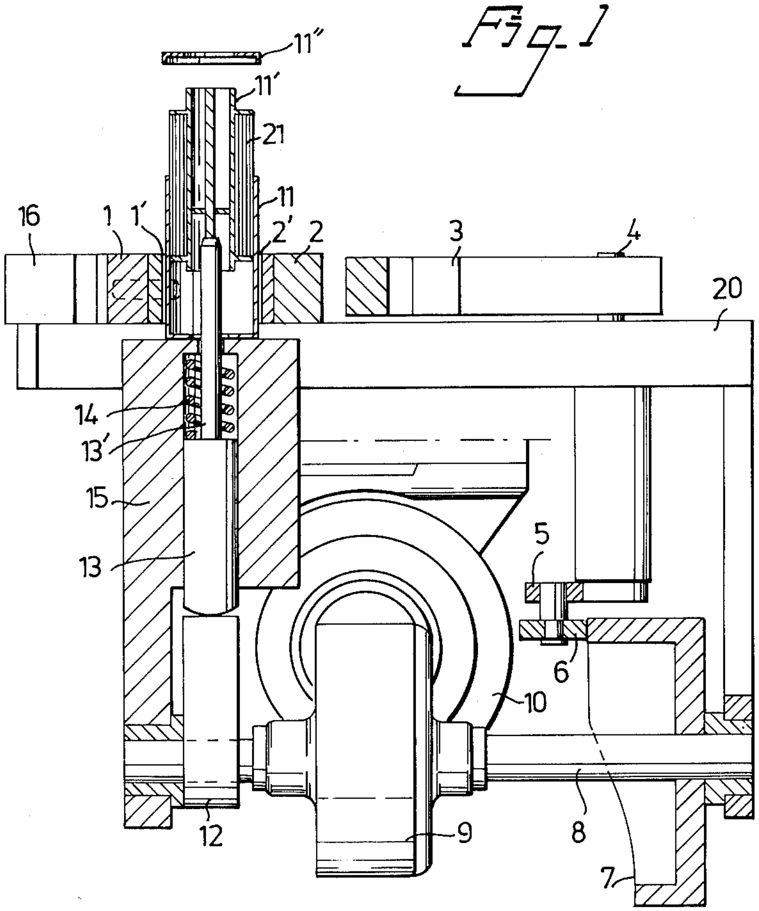
FIG. 1 shows the cassette opener according to the invention by way of a section along the line I—I in FIG. 2.
Figure 2:
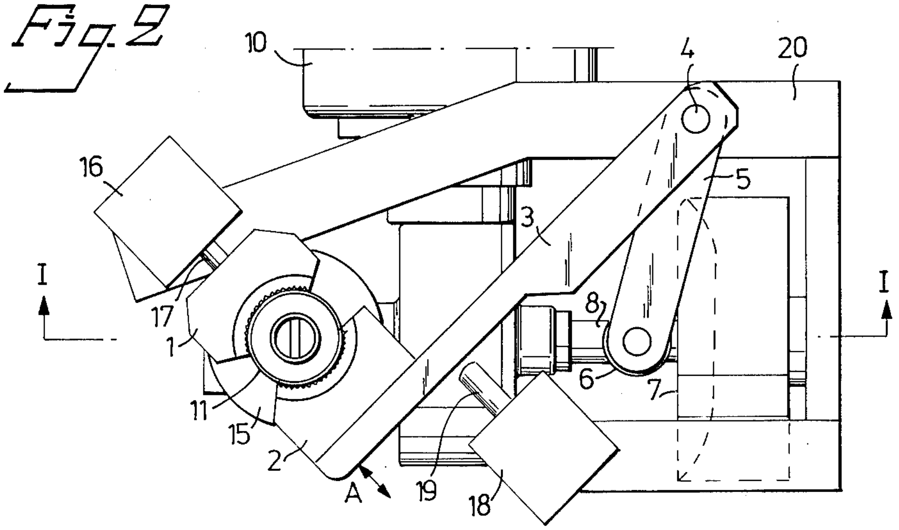
FIG. 2 shows the cassette opener according to FIG. 1 seen from above.

The cassette opener according to FIGS. 1 and 2 is equipped with a stationary jaw 1 and a jaw 2, which is movable in the direction toward and away from the jaw 1, as indicated by the double arrow A, and is supported on a locking arm 3 attached to one end of a pivot 4, at the other end of which a guide arm 5 with a guide wheel 6 against a curve drum 7 is attached. Said drum is mounted on a shaft 8, which via a worm gear 9 is in driving engagement with an electric motor 10. The two jaws 1, 2 have substantially semicylindric contact surfaces with saw teeth or jags 1′, 2′ to engage with a cylindric film cassette 11.

On said shaft 8, furthermore, an eccentric 12 is mounted, against which a longitudinal ejector 13 by action of a spring 14 rests. The ejector 13 is axially movable in a guide body 15 and formed with an ejector bar 13′, which is movable in the space between the jaws 1, 2 and in the longitudinal direction of the contact surfaces in order upon its ejecting to press against the film spool 11′ of the cassette 11.

Adjacent said stationary jaw 1 a switch 16 is stationary mounted, from which an axially movable contact pin 17 extends radially through the stationary jaw 1, and the outer end of which projects a short distance beyond the contact surface of the jaw 1 to engage with the cylindric surface of a film cassette 11.

Adjacent the pivotal locking arm 3 with the movable jaw 2 a further switch 18 is mounted, from which an axially movable contact pin 19 extends transversely across the pivoting range of the locking arm 3, according to the double arrow A, and to the locking arm 3. All parts of the cassette opener are supported on a frame 20.

The film cassette opener described operates as follows. A film cassette 11 is positioned with one end on the guide body 15 and pressed against the stationary jaw 1 and against the contact pin 17, which thereby is displaced and causes the switch 16 to close the current to the motor 10, which via the worm gear 9 rotates the shaft 8 and curve drum 7, whereby said curve drum 7 via the guide wheel 6, guide arm 5 and pivot 4 causes the locking arm 3 to pivot its jaw 2 against the cassette 11, which thereby owing to the saw teeth or jags 1′, 2′ is firmly retained between the jaws 1, 2.

The rotation of the shaft 8 in correct time sequence also causes the eccentric 12 to rotate, so that the ejector 13 is moved upward, and its ejector bar 13′ presses against the film spool 11′, which presses off the outer cassette cover 11″ and pushes out the spool 11′ with film 21, as appears from FIG. 1. In connection therewith, the rotating curve drum 7 causes the locking arm 3 to pivot outward from the cassette and displaces the adjacent contact pin 19 so that the switch 18 after the ejector bar 11′ has been pulled out of the cassette breaks the current to the electric motor 10, which consequently stops until a new film cassette has been attached.

The opener according to the invention involves the advantage, that the entire course of actions, viz. start of electric motor, clamping of cassette, removal of cover, ejection of spool with film, release of cassette and stop of electric motor, takes place in one sequence as soon as a film cassette has been pressed against the contact pin on the stationary jaw.

Figure 3:
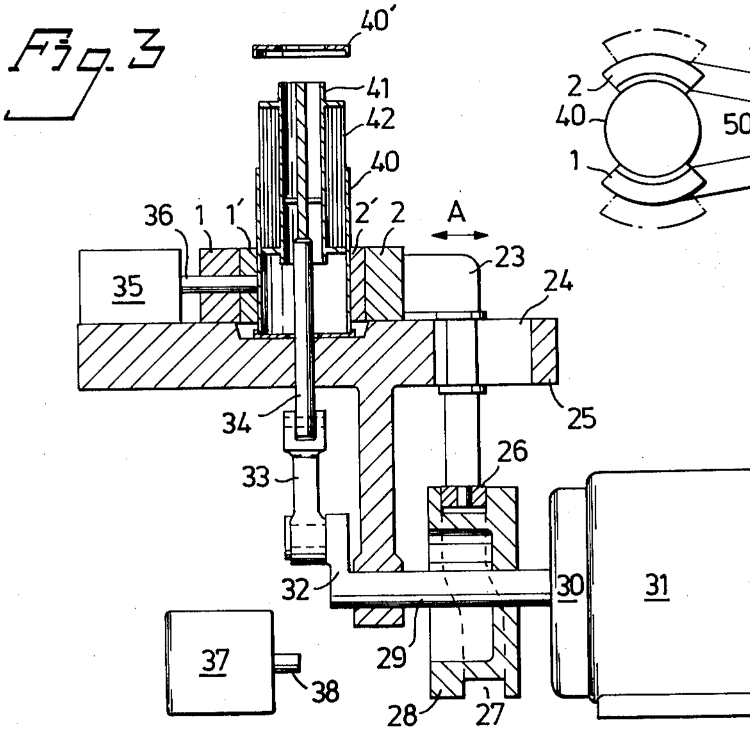
FIG. 3 is a lateral view, partly by way of a section, of a modified film cassette opener.
Figure 4:
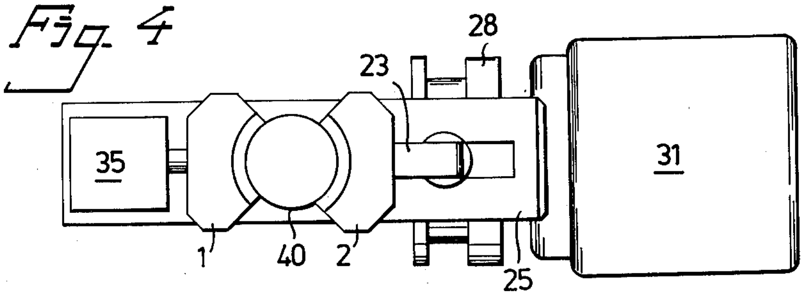
FIG. 4 shows the cassette opener according to FIG. 1 seen from above.

According to the embodiment shown in FIGS. 3 and 4, the cassette opener comprises a stationary jaw 1 and a jaw 2 movable in the direction toward and away from the jaw 1, as indicated by the double arrow A. The engaging surfaces of the jaws 1, 2, which face toward each other, are provided with a frictioning coat 1′, 2′, jags or the like. The movable jaw 2 is rigidly connected to a guide arm 23, which is guided in a guide slot 24 in a stand 25 and carries a guide wheel 26 in a curve groove 27 provided in a curve drum 28, which is mounted on a shaft 29, which via a toothed gear 30 is driven by an electric motor 31. The shaft 29 is provided with a crank 32, which by means of a hinged link 33 is connected to an ejector bar 34, which is axially guided in the stand 25, and the axis line of which lies centrally between the jaws 1, 2. Adjacent the stationary jaw 1, a switch 35 attached on the stand 25 is connected into the circuit of the motor 31 and comprises a pin-shaped axially movable control member 36, which runs free through the stationary jaw 1, and the outer end of which can be projected a short distance beyond the engaging surface of the jaw 1. A switch 37 fastened in a way not shown and connected into the circuit of the motor 31 projects with its control member 38 into the path of movement of the crank 32.

The described device operates as follows. The ejector bar 34 is assumed to be in its lower position and not to extend upward between the jaws 1, 2. A film cassette 40 is positioned between the open jaws 1, 2 and on the stand 25, as shown in FIG. 3, and is pressed against the control member 36. Thereby the switch 35 closes the circuit to the motor 31, and the motor starts, so that the shaft 39 due to the toothed gear 30 is rotated with suitable speed. Consequently, the curve drum 28 displaces the guide arm 23 and therewith the jaw 2 in the direction to the film cassette 40, which thereafter is firmly retained by the frictioning coat, jags or the like on the jaws 1, 2. The jaws 1, 2 engage with the outer surface of the cassette and not with its edge flange. At the same time, the ejector bar 34 is started to move upward by means of the crank 32, contacts the film spool 41 in the film cassette 40, pushes off the outer cassette cover 40', and presses the spool 41 with the film 42 at least partially out of the cassette 40, so that the spool with the film easily can be removed from the cassette. During the continued downward movement of the crank 32 the ejector bar 34 is pulled out of the cassette 40, and the guide arm 23 draws the jaw 2 from the cassette 40. When the crank 32 assumes its lowermost position, it actuates the control member 38, whereby the switch 37 causes the motor 31 to stop.

The embodiment according to FIGS. 3 and 4 shows the special advantages, that the details of the drive means have simple design, are easy to assemble and operate reliably for a rapid and handy opening of film cassettes.

Figure 5:
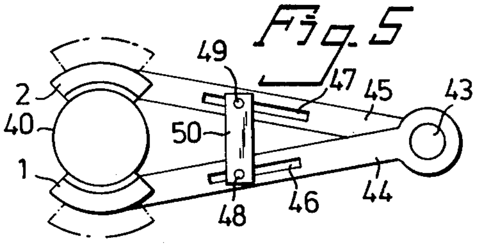
FIG. 5 shows a modified detail in the film cassette opener.

According to FIG. 5, the two jaws 1, 2 of the drive means are movable toward and away from each other, because they are rigidly connected each to a control arm 44, pivotally mounted on a pivot 43 with guide grooves 46 and 47, respectively, and in each of which with a guide pin 49, 50 on a cross-piece 50 intended be rigidly connected to the guide arm 23 comprised in the device according to FIGS. 3, 4. Upon movement of the guide arm 23 in the guide groove 24, the jaws 1, 2 are moved toward and away from the film cassette 40, as indicated by the fully drawn and dash-dotted lines, respectively, for the positions of the jaws.

Figure 6:
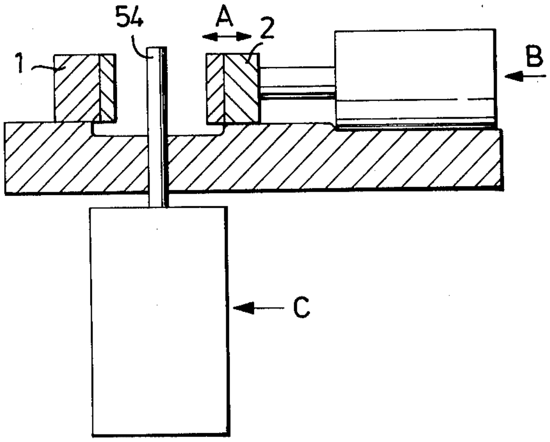
FIG. 6 is a lateral view of a further modified film cassette opener.

According to the schematically drawn FIG. 6, one jaw is stationary attached to the stand 25, and the other jaw is movable in the direction toward and away from the stationary jaw 1. The displacing means of the jaw 2 is only schematically indicated (as a block) and designated by B, and it may be an electromagnet, the iron core of which is connected to the jaw 2 and spring-actuated in one direction, or it may be a pneumatic or hydraulic means, the piston rod of which is connected to the jaw 2, or it may be a lineary motor connected to the jaw 2. The displacing means of the ejector bar, too, is only schematically indicated (as a block) and designated by C. It preferably is a hydraulic means, the piston rod of which is connected to the ejector bar 14, or it is a mechanic drive means, for example according to FIG. 1, so that the ejector bar has definite positions of movement depending on and in agreement with the operation of the drive means. When both displacing means B, C are hydraulic ones, the hydraulic fluid can be directed to and from the hydraulic means B, C from a common fluid pressure source, preferably via pressure control valves. The displacing means C for the ejector bar 14 may also be an electromagnet device, if it can be given a suitably small dimension in spite of the considerable pressure force required for pushing off the outer cover from the cassette.

The invention must not be regarded restricted to the embodiments described and shown, because they can be varied within the scope of the invention. At least one of the jaws, for example, can have a certain resilience for adjustment to slightly varying outer diameters of different cassettes and for preventing damage on the same when the diameter happens to be greater than normal. The automatically actuated starting switch may be actuated manually, and the stopping switch may be actuated by substantially any one of the movable details of the device in a certain position. The details in one of the devices described may be exchanged against details in the other one of the devices described. The film cassette need not be a separate cylindric cassette, but may be part of a magazine etc. with the film roll, and the engaging surfaces of the jaw be designed accordingly.

I claim:

1. A film cassette opener, characterized in that it comprises a pair of mutually movable jaws (1, 2) with contact surfaces, which preferably are provided with saw teeth or jags (1', 2') for reliably retaining a film cassette (11) positioned between the jaws and containing a film (21) rolled on a spool (11'), and an axially reciprocating ejector bar (13'), which by means of a mechanic drive means is displaceable axially relative to the retained film cassette and capable with one end to thrust against the spool with film, so that the spool first pushes off the outer end wall cover (11'') of the film cassette and thereafter together with the film is pressed out of the film cassette.

2. An opener according to claim 1, characterized in that one jaw (1) is mounted stationary, and the other jaw (2) is mounted movably, that the movable jaw (2) is supported on a pivotal locking arm (3), which is mounted on a pivot (4) by a guide arm (5) with a guide wheel (6) against a curve drum (7) on a shaft (8), which via a worm gear is in driving engagement with an electric motor (10), on which shaft (8) an eccentric (12) is attached, against which by spring pressure a longitudinal ejector (13) rests, with an ejector bar (13') displaceable in the space between the jaws and in the longitudinal direction of the contact surfaces of said jaws, in order with their outer end to abut an inner spool (11') of a film cassette retained between the jaws and while the outer end wall cover (11'') of the cassette is being pressed off to press the spool (11') with the film (21) out of the cassette casing.

3. An opener according to claim 2, characterized in that it comprises a switch (16) adjacent said stationary jaw (1), which switch has an axially displaceable contact pin (17) extending through said jaw, the outer end of which pin can be projected a short distance outside the contact surface of the jaw (1), but can be inserted and thereby switches on the switch (16) by pressing a film cassette thereagainst.

4. An opener according to claim 3, characterized in that it comprises a further switch (18), which is attached adjacent said pivotal locking arm (2), and from which an axially displaceable contact pin (19) extends to the locking arm (3), so that upon displacement in the direction to the switch by outward pivoting of the movable jaw (2) from the film cassette (11) by the locking arm said further switch (18) is switched off and the current to the electric motor (10) is interrupted.

5. An opener according to claim 1, at which one jaw (1) is stationary mounted, characterized in that the second jaw (2) is rigidly connected to a displaceable guide arm (23), which is guided in a guide slot (24) in a stand (25) and by means of a guide wheel (26) or the like is in engagement with a curve groove (27) in a curve drum (28) to assume a reciprocating movement, which curve drum is mounted on a shaft (29) with a crank (32), which via a hinged link (33) is connected to the ejector bar (34).

6. An opener according to claim 1, at which both jaws (1, 2) are displaceable toward and away from each other, characterized in that they are supported on pivotal guide arms (44, 45), which preferably are mounted on a common pivot (43) and provided with guide grooves (46, 47), into which guide pins (48, 49) on a cross-piece (50) displaceable by the drive means engage.

7. An opener according to claim 1, characterized in that the jaw (2) is displaceable by means of an electric motor or a pneumatic or hydraulic means (B), and that the ejector bar (54) is displaceable by a hydraulic means (C).

* * * * *